(12) United States Patent
Hirose et al.

(10) Patent No.: US 7,926,376 B2
(45) Date of Patent: Apr. 19, 2011

(54) RACK GUIDE AND RACK-AND-PINION TYPE STEERING APPARATUS HAVING THE RACK GUIDE

(75) Inventors: Masahiko Hirose, Osaka (JP); Masaaki Hashimoto, Osaka (JP); Nobuyuki Sato, Shiga (JP); Masao Shimura, Osaka (JP); Yoshiro Kuzumi, Kanagawa (JP)

(73) Assignees: Oiles Corporation, Tokyo (JP); JTEKT Corporation, Osaka (JP)

( * ) Notice: Subject to any disclaimer, the term of this patent is extended or adjusted under 35 U.S.C. 154(b) by 741 days.

(21) Appl. No.: 11/920,231

(22) PCT Filed: May 17, 2006

(86) PCT No.: PCT/JP2006/309865
§ 371 (c)(1),
(2), (4) Date: Nov. 20, 2007

(87) PCT Pub. No.: WO2006/123719
PCT Pub. Date: Nov. 23, 2006

(65) Prior Publication Data
US 2009/0038429 A1 Feb. 12, 2009

(30) Foreign Application Priority Data
May 18, 2005 (JP) .................................. 2005-146102

(51) Int. Cl.
*B62D 3/12* (2006.01)

(52) U.S. Cl. ................... 74/409; 74/422; 384/37; 384/42
(58) Field of Classification Search ............... 74/388 PS, 74/409, 422, 498; 384/37, 42
See application file for complete search history.

(56) References Cited

U.S. PATENT DOCUMENTS

| | | | | |
|---|---|---|---|---|
| 4,785,685 | A | * | 11/1988 | Kobayashi et al. ............ 74/498 |
| 5,022,279 | A | * | 6/1991 | Ueno et al. ..................... 74/422 |
| 5,682,959 | A | * | 11/1997 | Joerg et al. .................... 180/428 |
| 6,539,821 | B2 | * | 4/2003 | Bugosh .......................... 74/422 |

FOREIGN PATENT DOCUMENTS

| | | |
|---|---|---|
| FR | 2859439 | 11/2005 |
| JP | 55-068472 | 5/1980 |
| JP | 1993-056744 | 7/1993 |
| WO | 2004-045790 | 6/2004 |
| WO | WO 2004/045790 * | 6/2004 |

OTHER PUBLICATIONS

International Search Report for PCT/JP2006/309865 mailed Jun. 13, 2006.

* cited by examiner

*Primary Examiner* — William C Joyce
(74) *Attorney, Agent, or Firm* — Nixon & Vanderhye P.C.

(57) ABSTRACT

A rack and pinion steering device has a pinion rotatable in the R-direction, a rack bar having rack teeth meshing with the pinion and rectilinearly movable in the A-direction, a housing for rotatably supporting the pinion, a rack guide for slidably supporting the rack bar, and an elastic means for pressing the rack guide toward the pinion.

4 Claims, 5 Drawing Sheets

[Fig. 1]
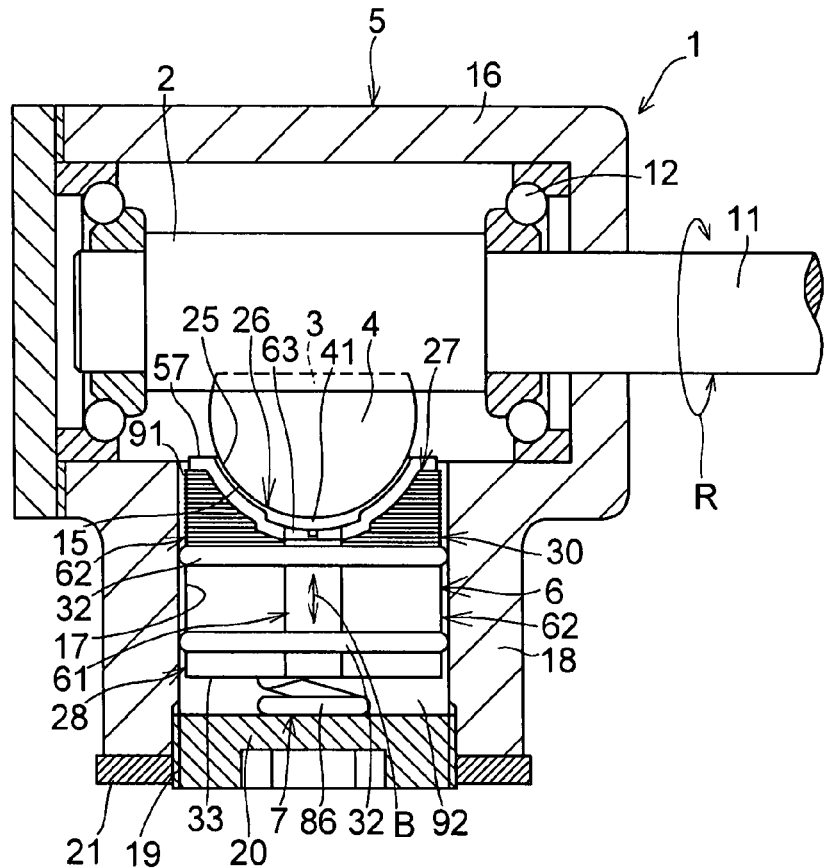
[Fig. 2]
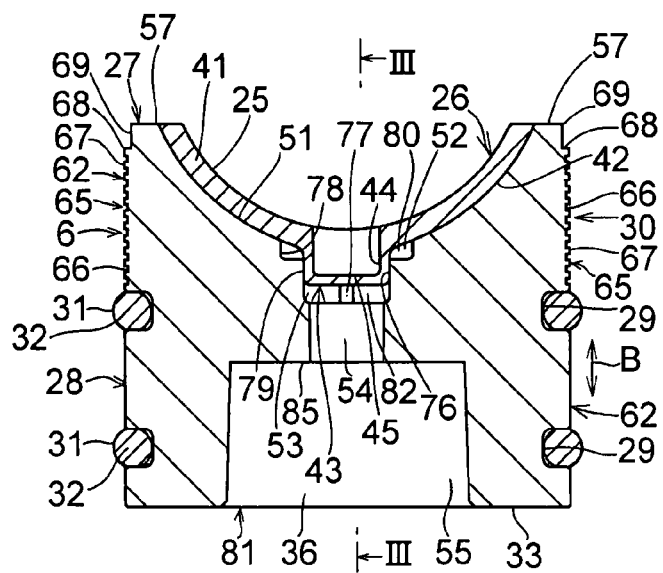

[ Fig. 3 ]
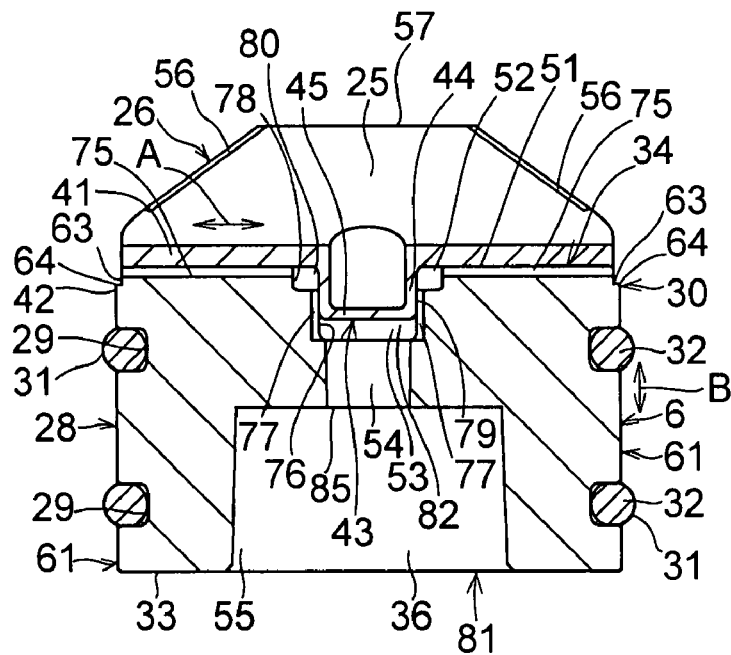
[ Fig. 4 ]
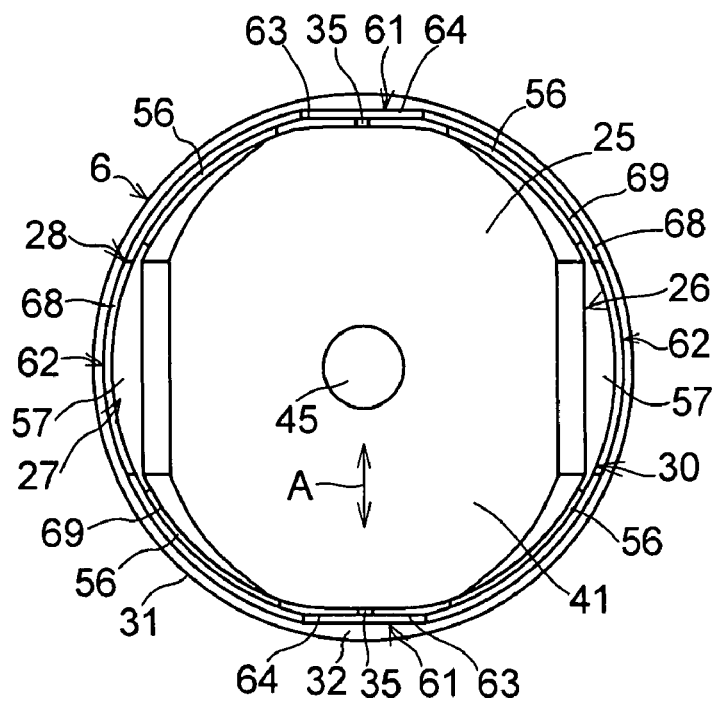

[Fig. 5]
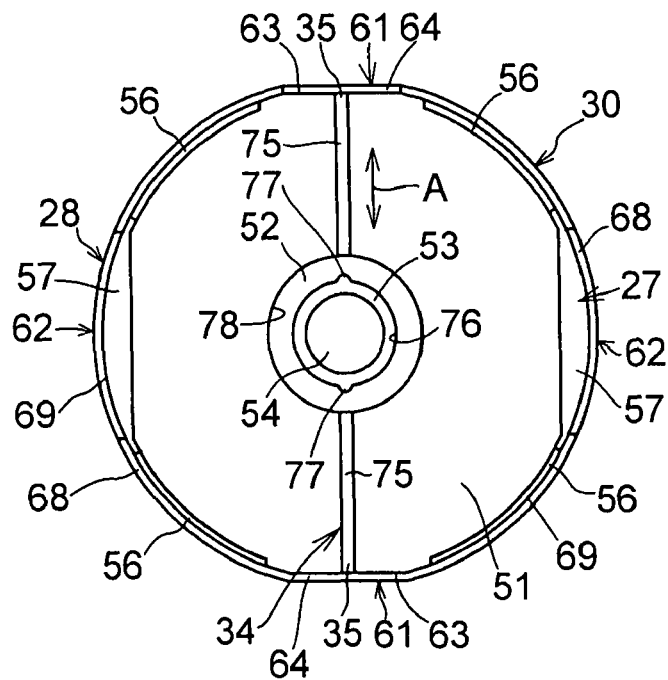
[Fig. 6]
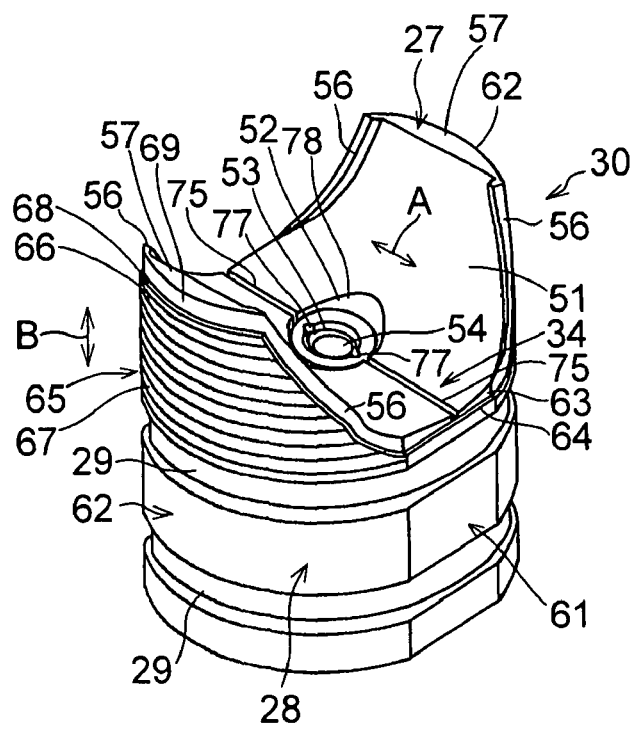

[Fig. 7]
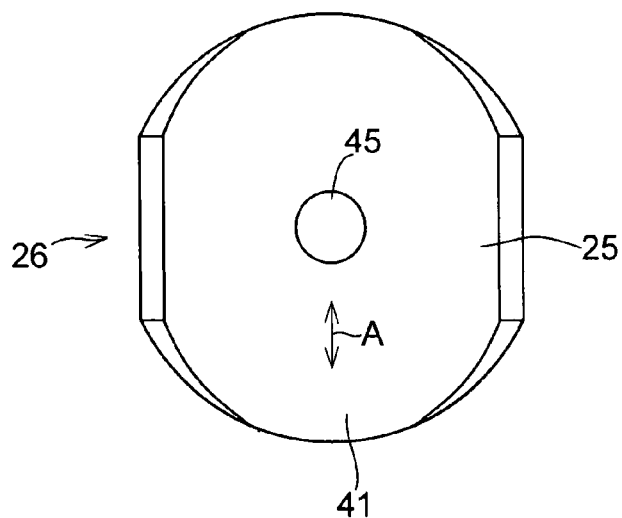
[Fig. 8]
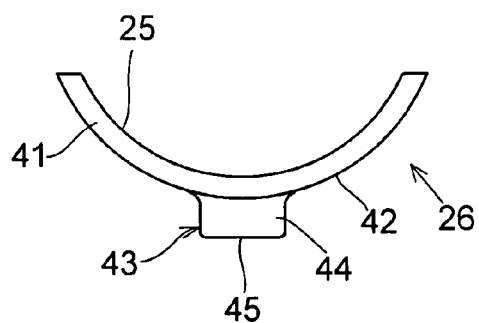
[Fig. 9]
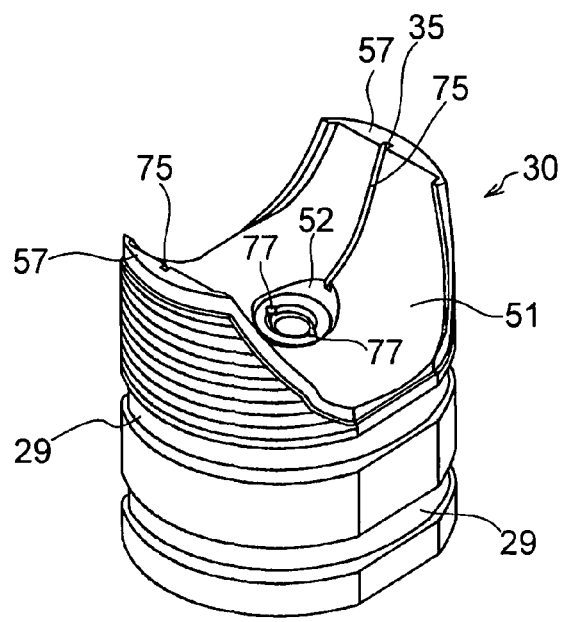

[Fig. 10]
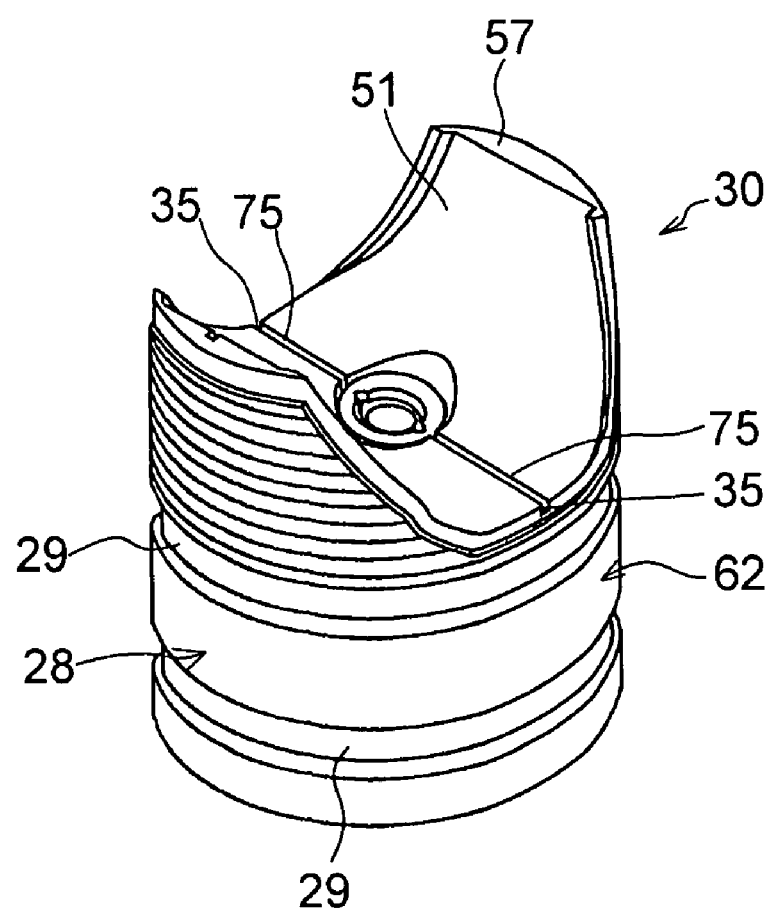

RACK GUIDE AND RACK-AND-PINION TYPE STEERING APPARATUS HAVING THE RACK GUIDE

This application is the U.S. national phase of International Application No. PCT/JP2006/309865 filed 17 May 2006 which designated the U.S. and claims priority to Japanese Application No. 2005-146102 filed 18 May 2005, the entire contents of each of which are hereby incorporated by reference.

TECHNICAL FIELD

The present invention relates to a rack guide for supporting a rack bar of an automotive steering mechanism and a rack-and-pinion type steering apparatus having the rack guide.

BACKGROUND ART

Patent document 1: JP-A-2000-142428

A rack-and-pinion type steering apparatus is generally comprised of a housing, a pinion rotatably supported by this housing, a rack bar having rack teeth meshing with this pinion, a rack guide disposed in the housing to slidably support the rack bar, and a resilient means such as a spring for pressing this rack guide toward the rack bar.

DISCLOSURE OF THE INVENTION

Problems to be Solved by the Invention

In such a rack-and-pinion type steering apparatus, the rack guide for slidably supporting the rack bar which linearly moves in the steering operation is slidably fitted in the housing with a very small gap (clearance) with the inner peripheral surface of the housing movably in a direction perpendicular to the linearly moving direction of the rack bar, so as to avoid the swinging motion of the rack guide itself. However, since the rack guide and the housing are generally formed of metal, the so-called "metal of similar composition" can possibly occur between the rack guide and the housing when the rack guide slides with respect to the housing. If such a "metal of similar composition" occurs, there arises the problem that the movement of the rack guide toward the rack bar is hampered due to an increase in the frictional resistance and adhesive wear.

Accordingly, it has been proposed to eliminate the direct contact of the rack guide with the housing by fitting a resilient ring on the rack guide. With the rack-and-pinion type steering apparatus based on such a proposal, it is possible to overcome the drawbacks due to the "metal of similar composition." However, as a result of the fact that the resilient ring fitted on the rack guide completely closes the very small gap which functions as an air passage between the inner peripheral surface of the housing and the rack guide, the circulation of air, which is effected through the very small gap as the rack guide moves with respect to the housing, becomes difficult, and the space between the housing and the end face of the rack guide becomes a closed air chamber. Owing to this closed air chamber, there arises the possibility that the speedy movement of the rack guide with respect to the housing is hampered.

The present invention has been devised in view of the above-described aspects, and its object is to provide a rack guide which makes it possible to overcome the drawbacks caused by the "metal of similar composition," and which makes it possible not to produce the closed air chamber between the housing and the end face of the rack guide and which makes it possible to thereby allow the rack guide to speedily move in the axial direction with respect to the housing and instantly respond to the displacement in the direction perpendicular to the linearly moving direction of the rack bar, as well as a rack-and-pinion type steering apparatus having the rack guide.

Means for Solving the Problems

The rack guide in accordance with the present invention comprises: a slider having a slidable surface which is adapted to slidably contact a rack bar; a rack guide base body which supports the slider at one axial end face thereof and has an annular groove at an outer peripheral surface thereof; an annular resilient member which is fitted to the annular groove of the rack guide base body and is adapted to contact an inner peripheral surface of a housing of a rack-and-pinion type steering apparatus at an outer peripheral surface projecting from the outer peripheral surface of the rack guide base body; and communicating means which is disposed in the rack guide base body and has one end portion opened to an interior of the housing at the outer peripheral surface or the one axial end face of the rack guide base body and another end portion opened thereto at another axial end face of the rack guide base body, so as to allow the interior of the housing on a side of the outer peripheral surface or the one axial end face of the rack guide base body to communicate with the interior of the housing on a side of the other axial end face of the rack guide base body, wherein the annular resilient member is disposed so as to contact the inner peripheral surface of the housing between the one end portion of the communicating means which is open at the outer peripheral surface or the one axial end face of the rack guide base body and the other end portion of the communicating means which is open at the other axial end face of the rack guide base body, as viewed in an axial direction.

According to the rack guide in accordance with the present invention, since the annular resilient member fitted in the annular groove of the rack guide base body is adapted to contact the inner peripheral surface of the housing of the rack-and-pinion type steering apparatus at its outer peripheral surface projecting from the outer peripheral surface of the rack guide base body, it is possible to eliminate the direct contact of the rack guide base body with respect to the housing. Further, the communicating means, which allows the interior of the housing on the side of the outer peripheral surface or the one axial end face of the rack guide base body to communicate with the interior of the housing on the side of the other axial end face of the rack guide base body, is disposed in the rack guide base body and has one end portion opened to the interior of the housing at the outer peripheral surface or the one axial end face of the rack guide base body and another end portion opened thereto at the other axial end face of the rack guide base body. Moreover, the annular resilient member is disposed so as to contact the inner peripheral surface of the housing between the one end portion of the communicating means which is open at the outer peripheral surface or the one axial end face of the rack guide base body and the other end portion of the communicating means which is open at the other axial end face of the rack guide base body, as viewed in an axial direction. Therefore, the interior of the housing on the side of the outer peripheral surface or the one axial end face of the rack guide base body and the interior of the housing on the side of the other axial end face of the rack guide base body divided by the annular resilient member can be communicated with each other, thereby making it possible not to produce a closed air chamber between the housing and the other axial end face of the rack guide. Thus, the rack guide in accordance with the present invention is able to instantly respond to the displacement in the direction perpendicular to the linearly moving direction of the rack bar.

In a preferred example, the slider includes a slider body having the slidable surface on one surface and a cylindrical projecting portion provided integrally on another surface of the slider body, and the rack guide base body includes a supporting surface provided on the one axial end face and adapted to support the slider body, a large-diameter recessed portion which is open at a central portion of the supporting surface and has a larger diameter than the diameter of the projecting portion of the slider, and a fitting hole which communicates with the large-diameter recessed portion and in which the projecting portion of the slider is fitted. Further, the communicating means includes a transverse groove which is covered by the slider body and is open at the outer peripheral surface or the one axial end face of the rack guide base body, a vertical groove which is covered by the projecting portion of the slider and is provided on an annular wall surface of the rack guide base body defining the fitting hole, an annular space which communicates with the transverse groove on one side and with the vertical groove on another side, and which is defined by an annular wall surface of the rack guide base body defining the large-diameter recessed portion and by an outer peripheral surface of the projecting portion of the slider, and a communicating passage which communicates with the fitting hole and is open at the other axial end face of the rack guide base body.

According to the rack guide of such an example, in a case where the rack guide base body is manufactured from, for example, aluminum or the like by the die casting process, the communicating means can be easily formed by only preparing a die having a shape capable of simultaneously forming the transverse groove and the vertical groove in addition to the large-diameter recessed portion and the fitting hole. Therefore, it is possible to substantially lower the manufacturing cost.

The projecting portion of the slider may be a bottomed cylindrical one having a hollow cylindrical portion and a bottom portion provided integrally on one end of the hollow cylindrical portion. Alternatively, however, the projecting portion of the slider may comprise only the hollow cylindrical portion which does not have the bottom portion. In the case of the bottomed hollow cylindrical projecting portion, the interior of the hollow cylindrical portion can be favorably used as a reservoir for a lubricant.

The communicating means may further include a cavity disposed between the communicating passage and a bottom portion of the projecting portion of the slider, in which case the cavity may communicate with the vertical groove on one side and with the communicating passage on another side.

Preferably, the rack guide base body has at least two annular grooves spaced apart in the axial direction, in which case annular resilient members may be respectively fitted in the annular grooves. If the rack guide base body has such at least two annular grooves, the swinging motion of the rack guide base body can be favorably suppressed.

The rack-and-pinion type steering apparatus in accordance with the present invention comprises: a rotatable pinion; the rack bar which has rack teeth meshing with the pinion and is linearly movable; the housing for rotatably supporting the pinion; the rack guide according to any one of the above-described aspects for slidably supporting the rack bar; and resilient means for pressing the rack guide toward the pinion.

As the slider, it is suitable to use a synthetic resin material such as a polyacetal resin or a polyamide resin, or a multilayered material consisting of a steel sheet, a porous sintered metal layer formed integrally on this steel sheet, and a synthetic resin layer impregnating and coated on this porous sintered metal layer and formed of a synthetic resin such as a polyacetal resin or a polyamide resin. In particular, as the slider having the slider body and the bottomed hollow cylindrical projecting portion, it is preferable to use one which is formed integrally by subjecting a plate-like material consisting of such a multilayered material to press forming.

Advantageous Effect of the Invention

According to the present invention, it is possible to provide a rack guide which makes it possible to overcome the drawbacks caused by the "metal of similar composition," and which makes it possible not to produce the closed air chamber between the housing and the end face of the rack guide and which makes it possible to thereby allow the rack guide to speedily move in the axial direction with respect to the housing and instantly respond to the displacement in the direction perpendicular to the linearly moving direction of the rack bar, as well as a rack-and-pinion type steering apparatus having the rack guide.

BEST MODE FOR CARRYING OUT THE INVENTION

Hereafter, a more detailed description will be given of the mode for carrying out the present invention with reference to the preferred embodiments illustrated in the drawings. It should be noted that the invention is not limited by these embodiments.

BRIEF DESCRIPTION OF THE DRAWINGS

FIG. 1 is an explanatory cross-sectional view of a preferred embodiment in accordance with the invention;

FIG. 2 is an explanatory cross-sectional view of a rack guide shown in FIG. 1;

FIG. 3 is a cross-sectional view, taken in the direction of the arrows along one III-III, of the rack guide shown in FIG. 2;

FIG. 4 is a plan view of the rack guide shown in FIG. 1;

FIG. 5 is a plan view of a rack guide base body shown in FIG. 1;

FIG. 6 is a perspective view of the rack guide base body shown in FIG. 1;

FIG. 7 is a plan view of a slider shown in FIG. 1;

FIG. 8 is a side elevational view of the slider shown in FIG. 1;

FIG. 9 is a perspective view of another preferred embodiment in accordance with the invention; and FIG. 10 is a perspective view of still another preferred embodiment in accordance with the invention.

DESCRIPTION OF THE PREFERRED EMBODIMENTS

In FIGS. 1 to 8, a rack-and-pinion type steering apparatus 1 in accordance with this embodiment is comprised of a pinion 2 which is rotatable in an R direction, a rack bar 4 which has rack teeth 3 meshing with the pinion 2 and is linearly movable in an A direction (a direction perpendicular to the plane of the drawing in FIG. 1), a housing 5 for rotatably supporting the pinion 2, a rack guide 6 for slidably supporting the rack bar 4, and a resilient means 7 for pressing the rack guide 6 toward the pinion 2.

A pinion shaft 11 on which the pinion is integrally provided is supported in the housing 5 by means of a pair of ball bearings 12 so as to be rotatable in the R direction, and is adapted to be rotated in the R direction in the steering operation.

The rack bar 4, which is moved linearly in the A direction through the meshing between the pinion 2 and the rack teeth 3 by the rotation of the pinion 2 in the R direction, has a sliding surface 15 which is provided on the opposite side to the surface where the rack teeth 3 are provided and which is constituted by a semicylindrical convex surface.

The housing 5 through which the rack bar 4 is passed includes a housing body portion 16 to which the ball bearings 12 are attached; a hollow cylindrical portion 18 formed integrally on the housing body portion 16 and having a cylindrical inner peripheral surface 17; and a cover portion 20 threadedly secured to one end portion of the hollow cylindrical portion 18 by means of a threaded portion 19. The cover portion 20 is fixed to the hollow cylindrical portion 18 by a lock nut 21 threadedly secured to the cover portion 20.

The rack guide 6 includes a slider 26 which is adapted to slidably contact the sliding surface 15 of the rack bar 4 and has a slidable surface 25 constituted by a semicylindrical concave surface; a rack guide base body 30 which supports the slider 26 at one end face 27 in an axial direction B perpendicular to the A direction and which has two annular grooves 29 formed at an outer peripheral surface 28 and spaced apart in the axial direction B; a pair of annular resilient members 32 which are constituted by O-rings or the like and which are respectively fitted to the annular grooves 29 of the rack guide base body 30 and are adapted to contact the inner peripheral surface 17 of the hollow cylindrical portion 18 of the housing 5 at their outer peripheral surfaces 31 projecting from the outer peripheral surface 28 of the rack guide base body 30; and a communicating means 34 which is disposed in the rack guide base body 30 which has one end portion 35 open to the interior of the housing 5 at the outer peripheral surface 28 of the rack guide base body 30 and the other end portion 36 open thereto at the other end face 33 in the axial direction B of the rack guide base body 30, so as to allow the interior of the housing 5 on the outer peripheral surface 28 side of the rack guide base body 30 to communicate with the interior of the housing 5 on the other end face 33 side in the axial direction B of the rack guide base body 30. Thus, the both annular resilient members 32 are disposed so as to contact the inner peripheral surface 17 of the hollow cylindrical portion 18 of the housing 5 between the one end portion 35 of the communicating means 34 which is open at the outer peripheral surface 28 of the rack guide base body 30 and the other end portion 36 of the communicating means 34 which is open at the other end face in the axial direction B of the rack guide base body 30, as viewed in the axial direction B.

The slider 26, which is formed of a thin steel plate, a porous sintered metal layer integrally formed on this thin steel plate, and a synthetic resin layer with which this porous sintered metal layer is impregnated and coated and whose synthetic resin layer side constitutes the slidable surface 25, includes a slider body 41 formed in the shape of a curved plate and having the slidable surface 25 on one surface, as well as a bottomed cylindrical projecting portion 43 provided integrally on the other surface 42 which is the opposite surface to the slidable surface 25 of the slider body 41. The projecting portion 43 has a hollow cylindrical portion 44 and a bottom portion 45 provided integrally on one end of the hollow cylindrical portion 44.

The rack guide base body 30 disposed in the hollow cylindrical portion 18 of the housing 5 and formed integrally of aluminum or the like includes, in addition to the annular grooves 29, a supporting surface 51 provided on the one end face 27 in the axial direction B and adapted to support the slider body 41; a large-diameter recessed portion 52 which is open at a central portion of the supporting surface 51 and has a larger diameter than the diameter of the hollow cylindrical portion 44 of the projecting portion 43; a fitting hole 53 which communicates with the large-diameter recessed portion 52 and in which the hollow cylindrical portion 44 of the projecting portion 43 of the slider 26 is closely fitted; a small-diameter hole 54 communicating with the fitting hole 53 and having a smaller diameter than the fitting hole 53; a recessed portion 55 which communicates with the small-diameter hole 54 and is open at the other end face 33 in the axial direction B of the rack guide base body 30; and four holding projections 56 provided integrally on both edge portions in the A direction of the supporting surface 51.

The supporting surface 51 constituted by a semicylindrical concave surface is in contact with the surface 42 which is a semicylindrical convex surface of the slider body 41.

The four holding projections 56 surrounding the slider body 41 are adapted to engage edges of the slider body 41 so as to prevent the positional offset of the slider body 41 with respect to the supporting surface 51.

The one end face 27 of the rack guide base body 30 has, in addition to the supporting surface 51, a pair of crescent-shaped end faces 57 continuing to that supporting surface 51. The outer peripheral surface 28 of the rack guide base body 30 has a pair of flat outer surfaces 61 opposed to each other in the A direction, as well as a pair of cylindrical surfaces 62 continuing to the flat outer surfaces 61 and each disposed between the pair of flat outer surfaces 61. Each of the pair of flat outer surfaces 61 is divided by the annular grooves 29 in the axial direction B, and each flat outer surface 61 has an edge portion flat outer surface 63 continuing to the supporting surface 51, and the edge portion flat outer surface 63 is located inwardly (on the large-diameter recessed portion 52 side) of the remaining portions of the flat outer surface 61 through a stepped portion 64. Each of the pair of cylindrical surfaces 62 is also divided by the annular grooves 29 in the axial direction B. In each cylindrical surface 62, a cylindrical surface 65 between the annular groove 29 and the end face 27 has a trapezoidal cylindrical surface 67 in which a plurality of retaining grooves 66 extending in parallel to the annular groove 29 to retain a lubricating oil such as grease are formed, as well as an edge portion cylindrical surface 69 located inwardly of the cylindrical surface 67 through a stepped portion 68. The end face 33 of the rack guide base body 30 has an annular shape.

The communicating means 34 includes a pair of transverse grooves 75 which are covered by the slider body 41 and is open to the interior of the housing 5 at each of the edge portion flat outer surfaces 63 of the outer peripheral surface 28 of the rack guide base body 30; a pair of vertical grooves 77 which are covered by the hollow cylindrical portion 44 of the projecting portion 43 of the slider 26 and are provided on an annular wall surface 76 of the rack guide base body 30 defining the fitting hole 53; an annular space 80 which communicates with the transverse grooves 75 on one side and with the vertical grooves 77 on the other side, and which is defined by an annular wall surface 78 of the rack guide base body 30 defining the large-diameter recessed portion 52 and by an outer peripheral surface 79 of the hollow cylindrical portion 44 of the projecting portion 43; a communicating passage 81 which communicates with the fitting hole 53 and is open to the interior of the housing 5 at the other end face 33 in the axial direction B of the rack guide base body 30; and a cavity 82 disposed between the communicating passage 81 and the bottom portion 45 of the projecting portion 43 of the slider 26 in the fitting hole 53.

One transverse groove 75 is provided in the supporting surface 51 of the rack guide base body 30 such that its one end portion 35 in the A direction is open to the interior of the housing 5 at the one edge portion flat outer surface 63, and such that its other end portion in the A direction is open to the annular space 80 at the annular wall surface 78. The other transverse groove 75 is provided in the supporting surface 51 of the rack guide base body 30 such that its one end portion 35 in the A direction is open to the interior of the housing 5 at the other edge portion flat outer surface 63, and such that its other end portion in the A direction is open to the annular space 80 at the annular wall surface 78. The pair of vertical grooves 77 are arranged in face-to-face relation to each other in the A direction. The cavity 82 formed between the small-diameter hole 54 and the bottom portion 45 of the projecting portion 43 of the slider 26 in the fitting hole 53 communicates with the vertical grooves 77 on one side and with the communicating passage 81 on the other side. The communicating passage 81 is constituted by the small-diameter hole 54 communicating with the cavity 82 and by the recessed portion 55 communicating with the small-diameter hole 54 and having the end portion 36.

The resilient means 7 has a coil spring 86 which is disposed between the rack guide base body 30 and the cover portion 20 in such a manner as to be compressed with its one end in contact with an annular face 85 of the rack guide base body 30 defining the recessed portion 55 and with its other end in contact with the cover portion 20. The coil spring 86 resiliently presses the slidable surface 25 of the slider 26 against the sliding surface 15 of the rack bar 4 by means of the rack guide base body 30.

In the above-described rack-and-pinion type steering apparatus 1, when the pinion shaft 11 is rotated in the R direction in the steering operation, the rack bar 4 is moved linearly in the A direction through the meshing between the pinion 2 and the rack teeth 3. As a result, the steering operation can be transmitted to automobile wheels connected to the rack bar 4. In the rack-and-pinion type steering apparatus 1, the rack guide 6 is adapted to guide the linear motion in the A direction of the rack bar 4 by coming into contact with the sliding surface 15 of the rack bar 4 at its slidable surface 25, and to secure the meshing between the pinion 2 and the rack teeth 3 by the resiliency of the resilient means 7. Moreover, the rack guide 6 is adapted to move in the axial direction B by being accompanied by the extension and contraction of the resilient means 7 by following the very small displacement in the axial direction B of the rack bar 4.

Incidentally, according to the above-described rack guide 6, since the annular resilient members 32 fitted in the annular grooves 29 of the rack guide base body 30 are adapted to contact the inner peripheral surface 17 of the housing 5 at their outer peripheral surfaces 31 projecting from the outer peripheral surface 28 of the rack guide base body 30, it is possible to eliminate the direct contact of the rack guide base body 30 with respect to the housing 5. As a result, it is possible to overcome the drawback caused by the "metals of similar composition." Further, the communicating means 34 allows the interior of the housing 5 on the outer peripheral surface 28 side of the rack guide base body 30, i.e., an annular space 91 between the inner peripheral surface 17 and the cylindrical surface 65, to communicate with the interior of the housing 5 on the end face 33 side in the axial direction B of the rack guide base body 30, i.e., a space 92 between the end face 33 and the cover portion 20. Furthermore, the both annular resilient members 32 are disposed so as to contact the inner peripheral surface 17 of the hollow cylindrical portion 18 of the housing 5 between the one end portion 35 of the communicating means 34 which is open at the outer peripheral surface 28 of the rack guide base body 30 and the other end portion 36 of the communicating means 34 which is open at the other end face 33 in the axial direction B of the rack guide base body 30, as viewed in the axial direction B. Therefore, the annular space 91 and the space 92 in the housing 5 divided by the annular resilient members 32 can be communicated with each other, and it is possible not to produce a hermetically closed air chamber between the cover portion 20 of the housing 5 and the end face 33 in the axial direction B of the rack guide 6. Hence, it becomes possible for the rack guide 6 to instantly move in the axial direction B with respect to the hollow cylindrical portion 18 of the housing 5 by following the very small displacement in the axial direction B of the rack bar 4. In consequence, it is possible to constantly ensure the close meshing between the pinion 2 and the rack teeth 3, thereby making it possible to eliminate the occurrence of abnormal noise due to the teeth collision between the pinion 2 and the rack teeth 3.

In the rack guide 6 in accordance with this embodiment, the rack guide 30 is provided with the transverse grooves 75 and the vertical grooves 77 which are each provided in a pair, the transverse grooves 75 and the vertical grooves 77 may respectively be one or three or more. Further, although each transverse groove 75 is made open to the interior of the housing 5 at the edge portion flat outer surface 63, in substitution for or in addition to it each transverse groove 75 may be made open to the interior of the housing 5 at the crescent-shaped end face 57 of one end face 27 in the axial direction B.

The outer peripheral surface 28 of the above-described rack guide base body 30 has the pair of flat outer surfaces 61 opposed to each other in the A direction, with the result that in a case where the rack guide base body 30 is manufactured from aluminum or the like by the die casting process, as runner channel ends are disposed at the portions of the die corresponding to such flat outer surfaces 61, even if runners produced by the runner channels after the casting are cut with slight cut remnants (projections), such cut remnants can be made not to project from a phantom circle defined by the cylindrical surface 62. In the present invention, however, the rack guide base body 30 may be one having the outer peripheral surface 28 which is not provided with the pair of flat outer surfaces 61 and is constituted by a circumferentially extending cylindrical surface 62, as shown in FIG. 10.

The invention claimed is:

1. A rack guide comprising:
a slider including a slider body having a slidable surface on one surface and a cylindrical projecting portion provided integrally on another surface of the slider body, the slidable surface being adapted to slidably contact a rack bar;
a rack guide base body including a supporting surface provided on one axial end face thereof for supporting said slider, an annular groove at an outer peripheral surface thereof, a large-diameter recessed portion which is open at a central portion of the supporting surface and has a larger diameter than the diameter of the projecting portion of said slider, and a fitting hole which communicates with the large-diameter recessed portion and in which the projecting portion of said slider is fitted;
an annular resilient member which is fitted to the annular groove of said rack guide base body and is adapted to contact an inner peripheral surface of a housing of a rack-and-pinion type steering apparatus at an outer peripheral surface projecting from the outer peripheral surface of said rack guide base body; and communicating means which is disposed in said rack guide base body and has one end portion opened to an interior of said housing at the outer peripheral surface or the one axial end face of said rack guide base body and another end portion opened thereto at another axial end face of said rack guide base body, so as to allow the interior of said housing on a side of the outer peripheral surface or the one axial end face of said rack guide base body to communicate with the interior of said housing on a side of the other axial end face of said rack guide base body, said communicating means including a transverse groove which is covered by the slider body and is open at the outer peripheral surface or the one axial end face of said rack guide base body, a vertical groove which is covered by the projecting portion of said slider and is provided on an annular wall surface of said rack guide base body defining the fitting hole, an annular space which communicates with the transverse groove on one side and with the vertical groove on another side, and which is defined by an annular wall surface of said rack guide base body defining the large-diameter recessed portion and by an outer peripheral surface of the projecting portion of said slider, and a communicating passage which communicates with the fitting hole and is open at the other axial end face of said rack guide base body, said annular resilient member being disposed so as to contact the inner peripheral surface of said housing between the one end portion of said communicating means which is open at the outer peripheral surface or the one axial end face of said rack guide base body and the other end portion of said communicating means which is open at the other axial end face of said rack guide base body, as viewed in an axial direction.

2. The rack guide according to claim 1, wherein said communicating means further includes a cavity disposed between the communicating passage and a bottom portion of the projecting portion of said slider, the cavity communicating with the vertical groove on one side and with the communicating passage on another side.

3. The rack guide according to claim 1, wherein said rack guide base body has as the annular groove at least two annular grooves spaced apart in the axial direction, annular resilient members being respectively fitted in the annular grooves.

4. A rack-and-pinion type steering apparatus comprising:
a rotatable pinion;
said rack bar which has rack teeth meshing with said pinion and is linearly movable;
said housing for rotatably supporting said pinion;
said rack guide according to claim 1 for slidably supporting said rack bar; and
resilient means for pressing said rack guide toward said pinion.

* * * * *